Sept. 27, 1966   P. G. ANDREWS   3,274,678
METHOD OF MAKING A MUFFLER
Original Filed May 11, 1962
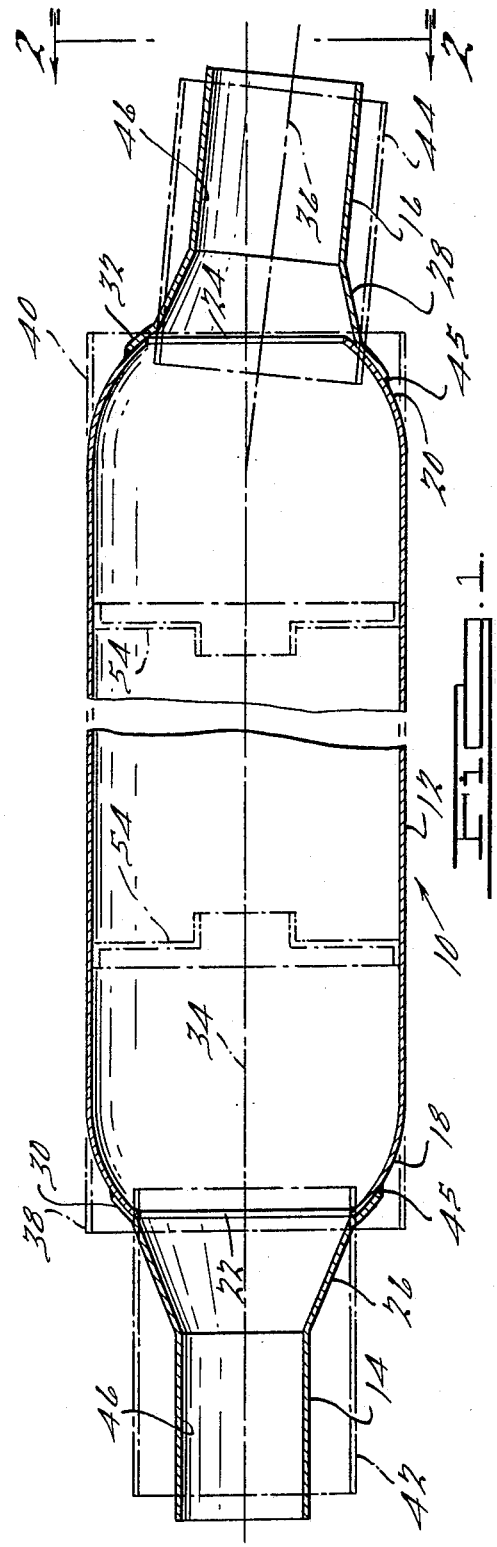
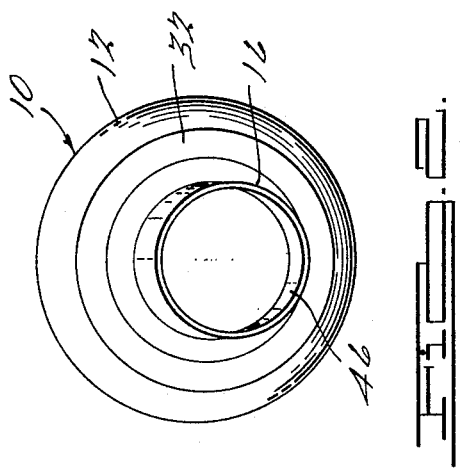
INVENTOR.
Peter G. Andrews
BY
Carmac, Dickey & Pierce
ATTORNEYS.

United States Patent Office 3,274,678
Patented Sept. 27, 1966

3,274,678
METHOD OF MAKING A MUFFLER
Peter G. Andrews, Kitchener, Ontario, Canada, assignor to Walker Manufacturing Company, a corporation of Delaware
Original application May 11, 1962, Ser. No. 193,927, now Patent No. 3,159,239. Divided and this application May 25, 1964, Ser. No. 370,021
1 Claim. (Cl. 29—471.1)

This invention relates generally to sound deadening devices and particularly concerns improvements in mufflers for internal combustion engines and the like. This application is a divisional application of Serial No. 193,927, filed May 11, 1962, now U.S. Patent No. 3,159,239.

In manufacturing mufflers for differently shaped and sized vehicles having differently shaped and sized exhaust system piping, it is necessary to construct the end fittings of the muffler shells so that they coincide in size and direction to the exhaust system piping into which the muffler is to be connected. This necesssity arises from the fact that the end fittings project into or over the ends of the exhaust system piping in a telescoping manner and, therefore, the fittings must be axially aligned with the piping as well as being the proper size. It follows, therefore, that many variations in the size and direction of these end fittings must be provided. On low production mufflers the cost of tooling and short-run setups to provide various end fitting alignments can be very high per muffler and can result in abnormally high muffler prices.

It is, therefore, an important object of the present invention to provide an improved low cost muffler shell and end fitting arrangement which reduces the cost of manufacturing mufflers having variable end fitting configurations and sizes.

Another object is to minimize or eliminate the need for alteration of muffler manufacturing facilities for the manufacture of mufflers having differently directed end fittings.

Another object is to provide an improved joint between the open ends of a muffler shell and the end fittings therefor, which joint can function as an adapter for adapting various size muffler shells to various size and directed end fittings.

A further and more specific object is to provide a three-piece muffler shell construction readily adapted for manufacture for a variety of sizes and shapes of vehicle exhaust systems.

Further objects, advantages and novel features of the invention will become apparent from the following description, claim, and drawings wherein:

FIGURE 1 is a longitudinal sectional view of a preferred form of the three-piece muffler shell; and FIG. 2 is a right hand end view of the shell of FIG. 1.

Referring to the drawings, a muffler shell generally designated 10 comprises a cylindrical body 12 and a pair of tubular end fittings 14 and 16. The opposite ends of body portion 12 are given arcuate curvatures 18 and 20. These are preferably of the same radius of curvature, but, may be formed on different radii should such be desirable. Surfaces 18 and 20 each preferably comprise segments of hemisphere for a purpose hereinafter described. The body ends are apertured at 22 and 24. The end fittings 14 and 16 are flared at 26 and 28, respectively; and the outer portions of these flares are formed with arcuate hemispherical segments 30 and 32 respectively having circumferences concentric with arcuate surfaces 18 and 20, respectively. This construction allows fittings 14 and 16 to be respectively positioned on the outside of surfaces 18 and 20 either in alignment with or angularly to the longitudinal axis 34 of the muffler body while forming gas tight seals at the juncture of the surface pairs 18, 30 and 20, 32. The angular direction is illustrated by end fitting 16 whose longitudinal axis 36 is offset several degrees from axis 34 of the body 12.

The arcuate end surfaces 18 and 20 of the body 12 are formed from a straight tube as indicated by the phantom lines 38 and 40 in FIG. 1 by rolling or swaging or other suitable metal forming operation. Similarly, the flared portions 26 and 28, and the arcuate surfaces 30 and 32 respectively of end fittings 14 and 16 are formed from straight tubes 42 and 44 indicated by the phantom lines also by rolling, swaging, or other suitable metal forming operation.

Any suitable internal sound attenuating structure 54 inside of the muffler may be used. Structure in accordance with a copending U.S. application of R. A. Heath, Serial No. 115,991, now Patent No. 3,141,518, and assigned to the assignee hereof is preferable.

End fittings 14 and 16 are secured to body 12 after the proper angular direction of these fittings with respect to the exhaust system piping has been determined and the fittings adjusted on body 12. This securement may be made by various means but is preferably an annular weld along the peripheral edges of the arcuate surfaces of the fittings as indicated at 45.

It is seen that regardless of the angular position of the end fittings on body 12 the bores or cavities 46 of the fittings thereof are in wide open communication with the open ends 22 and 24 of the body. The surfaces 30 and 32 may be made of larger area than shown to cover more of surfaces 18 and 20 respectively to provide better seals and to allow greater angular offset than is illustrated by fitting 16.

Modifications may be made without departing from the spirit and scope of the invention.

I claim:

The method of making a muffler for automotive exhaust systems, said muffler having an outer shell and conduit connecting fittings at opposite ends which comprises inserting silencing means inside said shell, indenting the opposite ends of a tubular outer shell to form spherical surfaces, enlarging the ends of tubular end fittings to form spherical surfaces thereon, positioning the spherical surfaces of the fittings on the spherical surfaces at the ends of the shell and adjusting said fittings so that the axes thereof make the desired angles with the axis of the shell, and welding the spherical surfaces of the fittings to the spherical surfaces of the shell.

References Cited by the Examiner

UNITED STATES PATENTS

| | | | |
|---|---|---|---|
| 1,608,245 | 11/1926 | Schwager | 181—61 X |
| 1,695,375 | 12/1928 | Heather. | |
| 1,838,249 | 12/1931 | Brown | 29—482 X |
| 2,200,162 | 5/1940 | De Vulitch | 29—479 |

JOHN F. CAMPBELL, *Primary Examiner.*